(12) United States Patent
Wideman (10) Patent No.: US 8,886,606 B2
(45) Date of Patent: Nov. 11, 2014

(54) FILE SYSTEM BASED EXCHANGE BETWEEN DISK-BASED NETWORK ATTACHED STORAGE AND TAPE

(76) Inventor: Roderick B. Wideman, Shakopee, MN (US)

( * ) Notice: Subject to any disclaimer, the term of this patent is extended or adjusted under 35 U.S.C. 154(b) by 285 days.

(21) Appl. No.: 13/459,350

(22) Filed: Apr. 30, 2012

(65) Prior Publication Data

US 2013/0290261 A1      Oct. 31, 2013

(51) Int. Cl.
| | | |
|---|---|---|
| G06F 17/00 | (2006.01) | |
| G06F 7/00 | (2006.01) | |
| G06F 17/30 | (2006.01) | |

(52) U.S. Cl.
CPC .... *G06F 17/30182* (2013.01); *G06F 17/30386* (2013.01); *G06F 17/30126* (2013.01); *G06F 17/30091* (2013.01)
USPC ............ 707/640; 707/822; 711/111; 709/213

(58) Field of Classification Search
None
See application file for complete search history.

(56) References Cited

U.S. PATENT DOCUMENTS

| | | | | |
|---|---|---|---|---|
| 8,566,517 | B1* | 10/2013 | Sims et al. | 711/111 |
| 2004/0153481 | A1* | 8/2004 | Talluri | 707/200 |
| 2007/0103984 | A1* | 5/2007 | Kavuri et al. | 365/185.17 |
| 2011/0178994 | A1* | 7/2011 | Fujihara et al. | 707/690 |
| 2011/0213814 | A1* | 9/2011 | Fukatani et al. | 707/827 |
| 2012/0158882 | A1* | 6/2012 | Oehme et al. | 709/213 |
| 2012/0300330 | A1* | 11/2012 | Martin | 360/48 |
| 2012/0323934 | A1* | 12/2012 | Amir et al. | 707/752 |
| 2013/0159656 | A1* | 6/2013 | Koarashi | 711/165 |
| 2013/0179733 | A1* | 7/2013 | Frank et al. | 714/29 |

* cited by examiner

*Primary Examiner* — Dung K Chau (57) ABSTRACT

Example apparatus and methods concern a file system based interface between a disk-based network attached storage device and a linear tape open (LTO) linear tape file system tape. One example method may include controlling a device (e.g., backup server) to read a file from the NAS device using a shared file system (e.g., NFS, CIFS) and controlling the device to write the file to the LTO tape device using the LTFS. Since the NAS device and the LTO device may have different information or metadata requirements, and since the shared file system and the LTFS may have different information or metadata requirements, the method may include controlling the device to remove from the file information specific to the NAS and the shared file system. Additionally, the method may include controlling the device to add to the file information specific to the LTFS or the LTO device.

15 Claims, 8 Drawing Sheets

FILE SYSTEM BASED EXCHANGE BETWEEN DISK-BASED NETWORK ATTACHED STORAGE AND TAPE

BACKGROUND

The amount of data being stored continues to increase. The importance of the data being stored also continues to increase. Thus, it follows logically that the number and types of devices for storing data has expanded to accommodate the increasing amounts of ever more important data. Data storage choices now include disks, tapes, collections of disks (e.g., redundant arrays of independent disks (RAID)), tape libraries, network attached storage (NAS), solid state drives (SSD), and other devices. Having more devices to store data makes it more likely that a user will find an appropriate device for storing their data. However, the ability to integrate devices so that data can be seamlessly moved from device to device varies inversely with the number and types of devices involved.

As the amount of data being stored continues to increase, efforts to reduce redundancy in stored data also continue to increase. De-duplication is one method for addressing redundancy in stored data. As the amount of data being stored continues to increase, other data management efforts are also increasing. For example, users may want to ensure that there are secure backups of their data, both on site and off site. Users may want to ensure that certain portions of their data are replicated to various locations throughout their enterprise. Users may want some data to be available in a first, faster time frame while other data is allowed to be available in a second, slower time frame. Decisions made concerning issues like reducing redundancy, increasing security, and manipulating availability may be guided, at least in part, by costs associated with these actions.

Thus, as the amount of data being stored increases, as the options concerning what can be done with the stored data increases, and as the costs associated with those options vary, being able to move data between storage devices has become more interesting. However, at times, providers of devices may have only addressed moving data from their device to some other specific device or sets of devices. This may have made it difficult to move data from their device to some other device for which they had not provided a driver or other mechanism. Additionally, some providers of devices may have produced proprietary systems that made it difficult, if even possible at all, to move data between devices.

One place where users store data is referred to as a network attached storage (NAS) device. An NAS device may provide file system based file-level data storage for a network. The file-level data storage may facilitate providing data access to heterogeneous clients on the network. Since it is designed to interact with a network, an NAS device may operate as a file server for a network. An NAS device may facilitate file sharing between multiple computers on a network. NAS devices may be, for example, networked appliances that contain one or more hard disk drives. These disk drives may be arranged in different RAID configurations. In one example files on NAS devices may be accessed using file sharing protocols like NFS (network file system) or CIFS (common internet file system).

NFS is a distributed file system protocol. NFS is typically a UNIX or LINUX based approach to provide a client computer access to files on a server computer. NFS attempts to make the remote access across the network operate similarly to how local access to a local device would work. CIFS is typically a non-UNIX based approach that provides functionality similar to NFS. CIFS may also be referred to as SMB (server message block) because it supports a client/server based approach to providing shared access to files. There are many examples of backup appliances, servers, or services that have been configured to access files on NAS devices using NFS and CIFS protocols.

Another place where users store data is on a physical tape. The physical tape may be read or written when placed in a physical tape drive. Some devices (e.g., tape library) may include multiple physical tape drives and physical tapes. Physical tapes can be inserted into and removed from different physical tape drives at different times. Different physical tape manufacturers and physical tape drive manufacturers may have taken their own approach to storage without regard to what other providers were doing. Over time, however, some standards arose that made it more likely that a tape could be used in different tape drives. The LTO (linear tape open) standard is an example of these standards.

LTO describes magnetic tape data storage technology that has evolved as a standard. The standard evolved partially as an alternative to propriety magnetic tape formats that made it more difficult if even possible at all, to use a tape created by one backup application in different devices with different backup applications. LTO has progressed through several revisions. In 2011, LTO-5 described a standard for storing up to 1.5 TB on a cartridge. LTO-5 also described a partition feature that allows tapes to be split into two separately addressable and writeable areas.

The NAS devices and tape devices described above illustrate how, over time, users have gained access to more and more types of devices for storing their data. While these multiple options have provided greater flexibility, they have also created integration and migration issues. One integration and migration issue concerns how to efficiently or practically move data from a disk-based NAS device to a tape-based backup device. One approach for moving data between disk-based NAS devices and tape-based devices involved the network data management protocol (NDMP). NDMP provided a framework for one solution for moving NAS-based data to a tape device by providing two different services, a data service (disk support) and a tape service (tape support). If a suitable bridge could be found between the two different services, then data sets could be moved.

NDMP is an open standard protocol whose two different services theoretically provide the bridge. An NDMP data service produces an NDMP data stream in a specified format between a disk and the NDMP server and an NDMP tape service produces an NDMP stream in a specified format between a tape and the NDMP server. The tape service and the data service have separate state machines and may operate independently. NDMP theoretically facilitates having heterogeneous network file servers communicate directly with both NAS devices (disk) and network attached tape devices. However, the theory may break down because disks and tapes store data in fundamentally different ways using fundamentally different mechanisms that make it difficult to perform the theoretical transfer of data from one to the other using NDMP.

While NDMP theoretically facilitates moving data from an NAS device to a tape device, there is a missing link because there is no Rosetta stone to bridge the gap between an NFS/CIFS file system perspective of data stored on an NAS disk based device or the NDMP data stream perspective of data received from an NAS device and the linear data set perspective of data stored on a tape device. Thus, although the lines of communication between devices were opened by an NDMP data service dealing with data streams between an NAS device and a backup server and an NDMP tape service dealing with data streams between the backup server and a tape device, a disconnect between perspectives on data organization still existed.

With the two NDMP data streams available, some apparatus and methods bridged the disconnect from disk to tape through the intermediary of a virtual tape library (VTL). A VTL presents one physical storage component (e.g., disk) as another logical storage component (e.g., tape library, tape). Thus, if a conversion from the disk-based NAS perspective to the tape-based VTL perspective could be made, and if a conversion from a VTL perspective to an actual tape library perspective could be made, then data could be copied from the NAS to the VTL and then from the VTL to an actual tape library. However, since a VTL is still presenting tape, this approach still reduces to the same disconnect present in other approaches. If a user is able to access a disk based NAS volume on one side of the VTL bridge using, for example, an NDMP data service, and is able to mount a tape volume on the other side of the VTL bridge using an NDMP tape service, then a user may be able to copy a data set from an NAS device to a tape device through the intermediary of a VTL that has access to two NDMP services. However, more efficient and more generalized approaches are sought.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods facilitate file exchange between an NAS disk-based device configured to be accessed by a shared file system (e.g., NFS, CIFS) and an LTO tape device configured to be accessed using the LTFS. Example apparatus and methods use a file system based presentation on both sides of the exchange and thus the exchange is performed using a file system based approach. NFS, CIFS, and other shared file systems allow a volume on an NAS disk-based device to be mounted by, for example, a backup appliance. LTFS also allows a volume on an LTO tape to be mounted by, for example, the same backup appliance. Example apparatus and methods control co-ordination of mounting, reading, and writing between shared filed systems and LTFS. Thus, example apparatus and methods provide a file system based exchange between disk-based NAS and tape.

LTO-5 supports LTFS. LTFS as supported by LTO-5 allows data on a tape to be treated like a mountable file system. Before LTO-5 it was difficult, if even possible at all, to mount a volume on a tape device and then provide a file system presentation of files on the tape. LTFS describes the format of data and metadata recorded on magnetic tape media. LTFS also describes the implementation of software that uses the format to provide a file system interface to data stored on a tape. The file system interface is more open than some conventional interfaces because LTFS provides an open description of the layout of data structures stored on the sequential access media. LTFS provides a self-describing tape format and file system that facilitate file level access to files. This file level access allows files and directories stored on tape to appear, for example, on desktops and directory listings. A file made accessible via LTFS may include some LTFS specific metadata or information.

Figure 1:
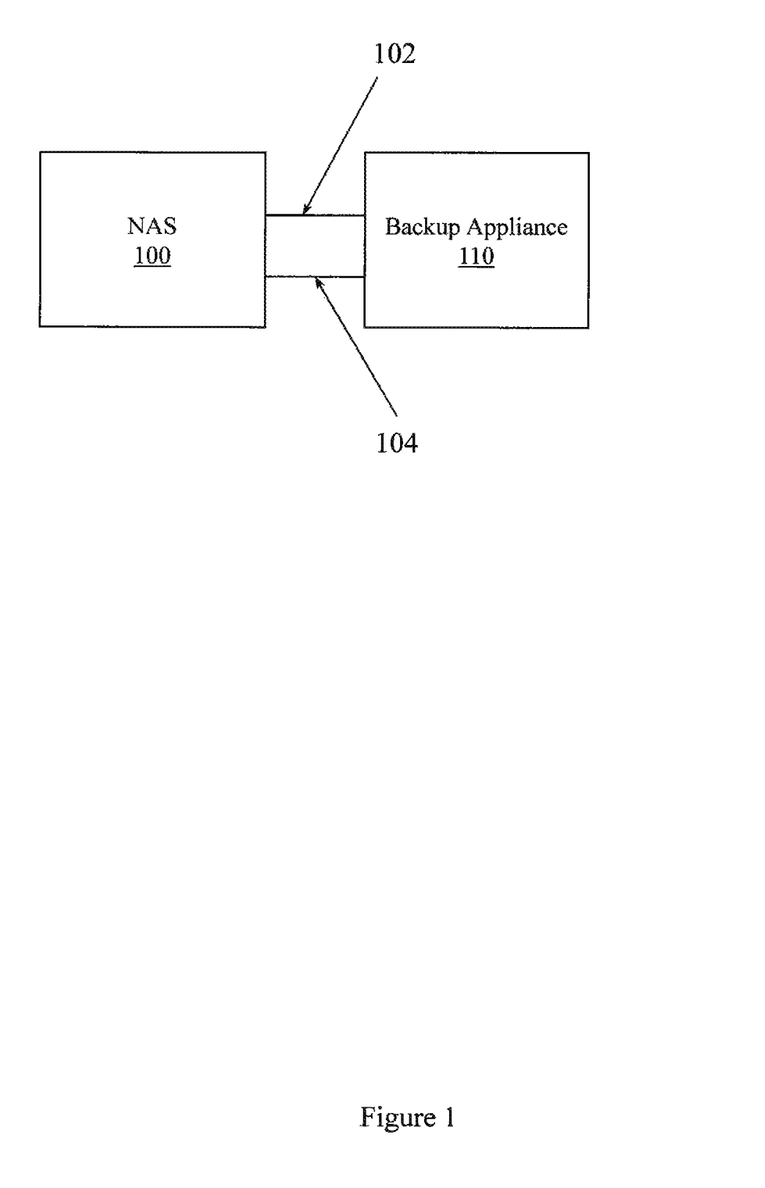
FIG. 1 illustrates communication between an NAS device and a backup appliance using a shared filed system protocol (e.g., NFS/CIFS) or NDMP.
Figure 2:
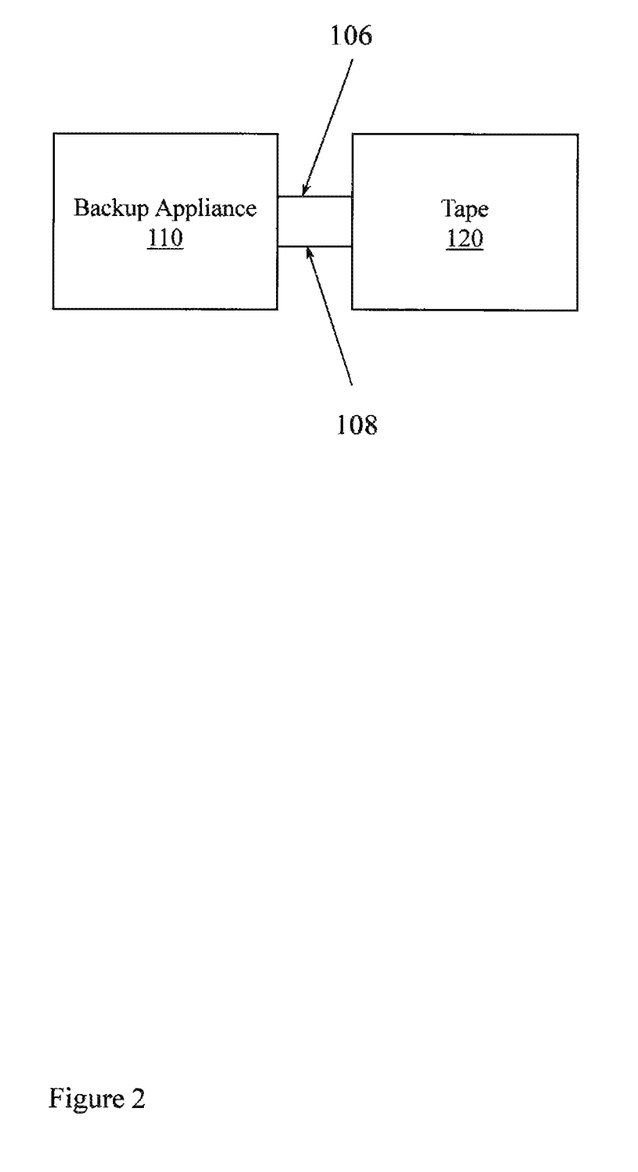
FIG. 2 illustrates communication between a backup appliance and a tape device using LTFS or NDMP.
Figure 3:
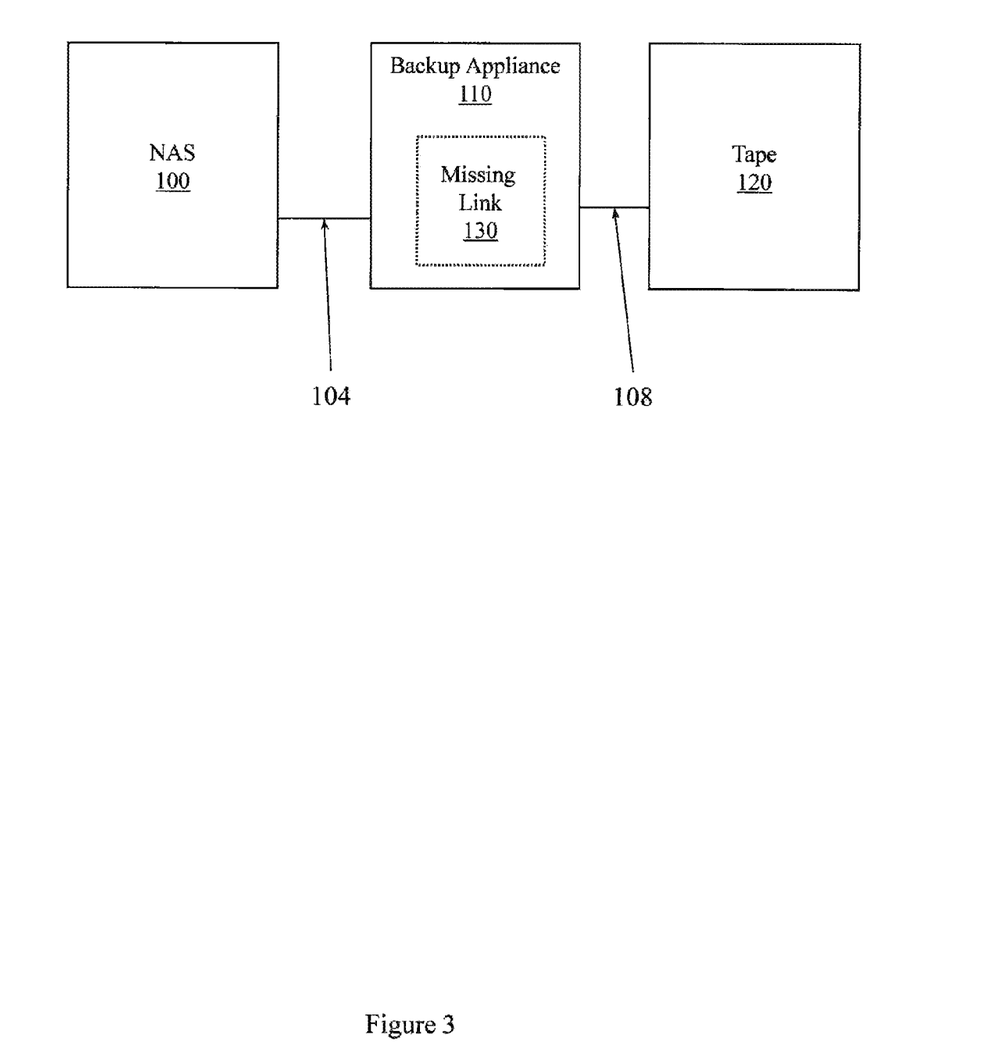
FIG. 3 illustrates a missing link in a theoretical communication between an NAS device and a tape device via a backup appliance that provides both an NDMP data service and an NDMP tape service.

FIG. 1 illustrates communication between an NAS device 100 and a backup appliance 110 using a shared filed system protocol 102 (e.g., NFS/CIFS) or NDMP 104. FIG. 2 illustrates communication between the backup appliance 110 and a tape device 120 using LTFS 106 or NDMP 108. FIGS. 1 and 2 illustrate that NAS devices and tape devices have the ability to communicate to a common device (e.g., backup appliance 110). Thus it seems logical to attempt to connect NAS device 100 and tape device 120 via backup appliance 110. FIG. 3 illustrates a flaw in this logic.

FIG. 3 illustrates a missing link 130 in a theoretical communication between NAS device 100 and tape device 120 via backup appliance 110 that provides both an NDMP data service 104 and an NDMP tape service 108. As described above, the missing link 130 is that disk based devices have one perspective on data and tape devices have a different perspective on data that may be incompatible with the disk based perspective. Example apparatus and methods take a different approach that bridges the missing link 130.

Figure 4:
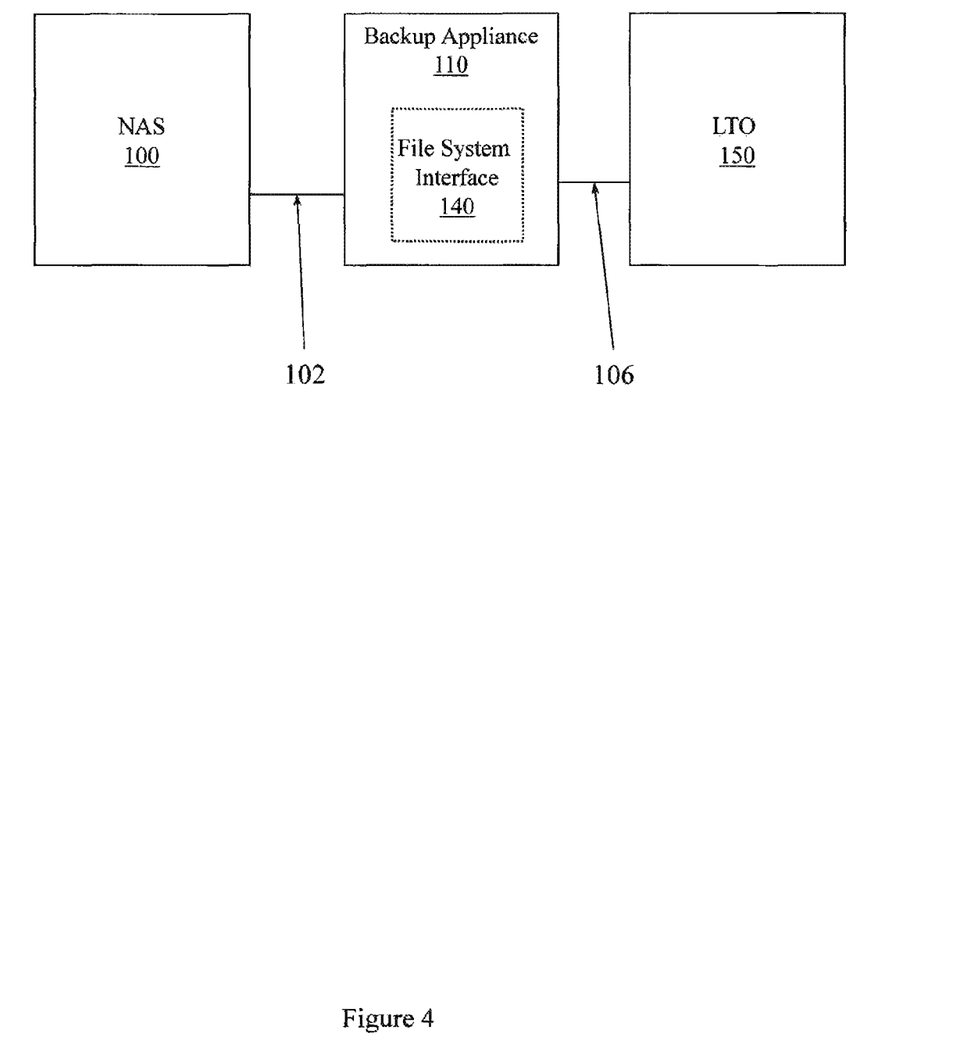
FIG. 4 illustrates communication between an NAS device and a tape device via a backup appliance using a shared file system protocol, LTFS, and a file system interface.

FIG. 4 illustrates communication between NAS device 100 and LTO device 150 via backup appliance 110 using a shared file system protocol 102, LTFS 106, and a file system interface 140. Shared file system protocol 102 (e.g., NFS, CIFS) provides file system level access to files on NAS device 100. LTFS 106 also provides files system level access to files on LTO device 150. File system interface 140 manipulates file system specific information to allow the exchange of files between the two different file systems. In one embodiment, NDMP data services could be used on both "sides" of the exchange.

Figure 5:
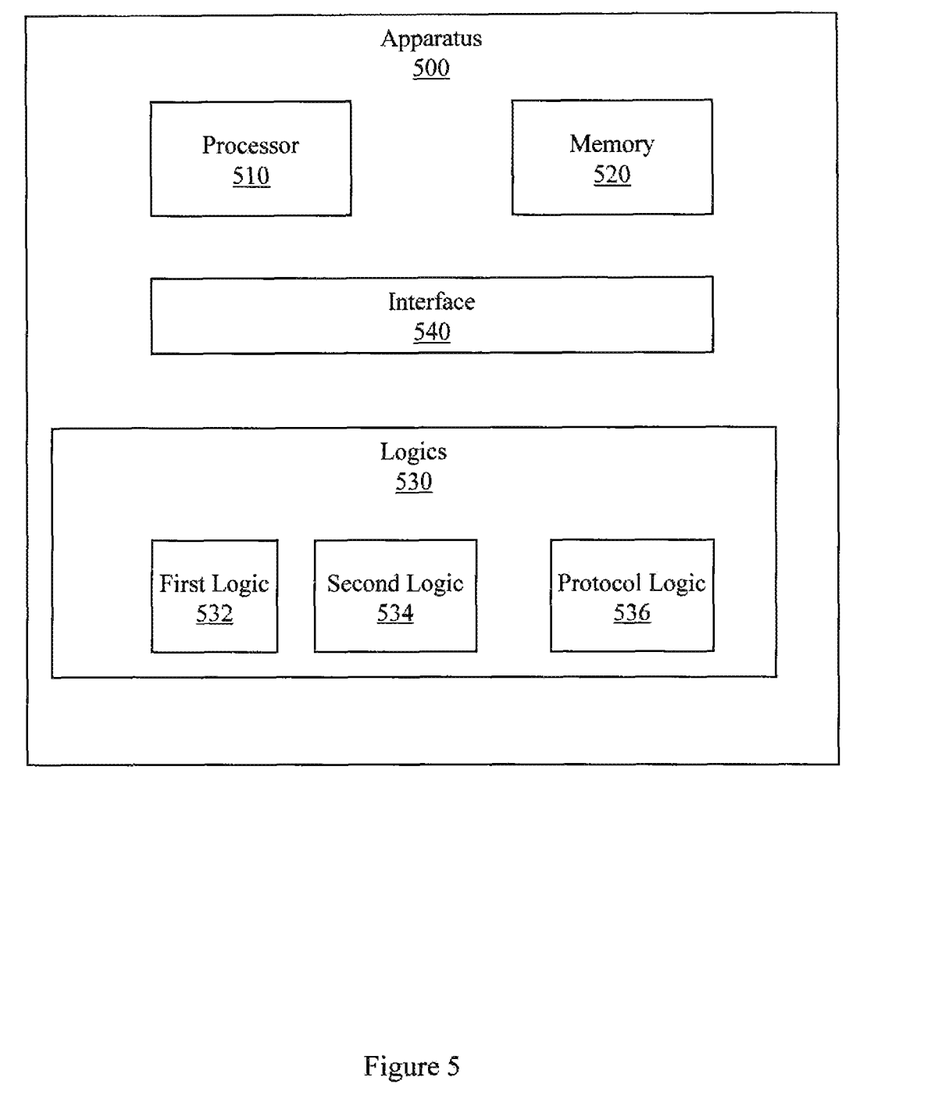
FIG. 5 illustrates an apparatus configured to facilitate copying between a source file system (e.g., NFS) and a target file system (e.g., LTFS) using a file system interface.

FIG. 5 illustrates an apparatus 500 configured to facilitate copying between a shared filed system (e.g., NFS, CIFS) and LTFS using a file system interface. Apparatus 500 includes a processor 510, a memory 520, a set 530 of logics, and an interface 540 to connect the processor 510, the memory 520, and the set 530 of logics. The set 530 of logics may be configured to copy a file between the disk-based NAS device as supported by a shared file system protocol and an LTO tape device as supported by a linear tape file system protocol. The apparatus 500 may be, for example, a backup server, a de-duplication server, a replication server, a disaster recovery server, or other type of computer. In one embodiment the set 530 of logics reside in a single apparatus. In another embodiment, the set 530 of logics may be distributed between two or more apparatus.

The set 530 of logics may include a first logic 532 that is configured to provide file input/output to the NAS device using the shared file system protocol. The shared file system may be, for example, NFS (network file system), CIFS (common internet file system), a shared distributed file system, a storage area network (SAN) file system, and a global file system.

The set 530 of logics may also include a second logic 534 that is configured to provide file input/output to the LTO tape device using the linear tape specific file system protocol. The linear tape specific file system protocol may be, for example, the LTFS associated with LTO-5.

The set 530 of logics may also include a protocol logic 536 that is configured to manipulate file system specific or protocol specific metadata associated with the file being copied between the disk-based NAS device and the LTO tape device. The protocol logic 536 may be configured to manipulate protocol specific metadata associated with the file by logically or physically removing source file system specific metadata from the file and by adding target file system specific metadata to the file. Thus, depending on the direction that the file is travelling (e.g., NAS to tape, tape to NAS), the protocol logic 536 may manipulate protocol specific metadata associated with the file by (a) logically or physically removing LTO or LTFS specific metadata from the file and by adding NAS or NFS specific metadata to the file or by (b) logically or physically removing NAS or NFS specific metadata from, the file and adding LTO or LTFS specific metadata to the file. While metadata is described, the source and target specific information may take forms other than metadata. For example headers, footers, check sums, and other fields may be manipulated. In one embodiment, there may be no metadata or other source file system information that needs to be removed and the action may be skipped. In one embodiment, there may be no metadata or other target file system information that needs to be added and the action may be skipped.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result. For example, at a first time a file may reside on a source device that is supported by a source file system but then after example apparatus and methods act, at a second later time the file may also reside on a target device that is supported by a target file system. Creating a specific physical arrangement of bits on a target system where that physical arrangement did not previously exist produces a physical transformation at the target machine.

It has proven convenient at times, principally for reasons of common usage, to refer to these signals as bits, values, elements, symbols, characters, terms, numbers, and in other ways. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
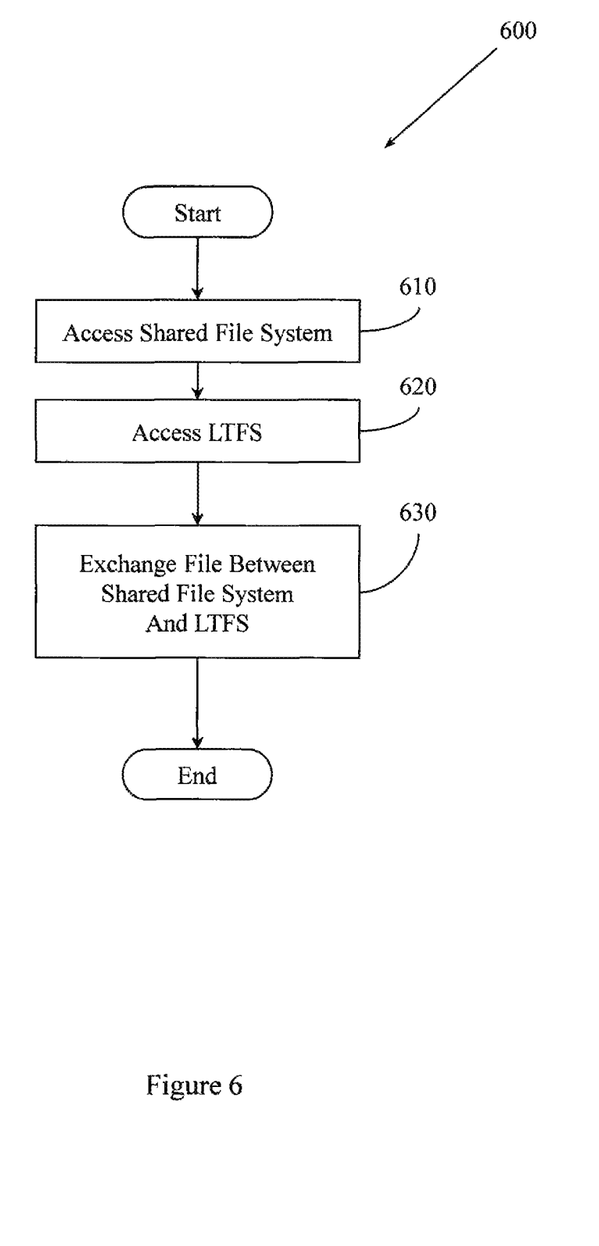
FIG. 6 illustrates a method for copying between a source file system (e.g., NFS) and a target file system (e.g., LTFS) using a file system interface.

FIG. 6 illustrates a method 600 for copying a file between a shared filed system on an NAS device and an LTFS on a tape device where the copying is performed using a file system interface. Method 600 includes, at 610, accessing a shared file system on an NAS disk-based device. In different embodiments the shared filed system may be, for example, NFS, CIFS, a shared distributed file system, a global file system, a storage area network (SAN) file system, or other file systems. Accessing the shared file system may include providing information (e.g., credentials, authentication information, volume identifiers, file identifiers) to the shared file system. Accessing the shared file system may also include receiving information (e.g., mount point data, volume data, file data) from the shared file system. Accessing the shared file system may include establishing a network connection or other connection between a computer executing method 600 and the NAS.

Method 600 also includes, at 620, accessing a tape file system on a tape device. The tape device may be, for example, a linear tape open (LTO) tape-based device. In one embodiment the tape file system is the LTFS (linear tape file system) associated with LTO-5. Other tape file systems may be employed. Accessing the tape file system may include providing information (e.g., credentials, authentication information, volume identifiers, file identifiers) to the tape file system. Accessing the tape file system may also include receiving information (e.g., mount point data, volume data, file data) from the tape file system. Accessing the tape file system may include establishing a network connection or other connection between a computer executing method 600 and the tape device.

Method 600 also includes, at 630, exchanging a file between the shared file system and the linear tape file system. The file is exchanged using a file system based approach throughout the exchange. As mentioned above, in one embodiment NDMP data services could be employed on both sides of the exchange. The file system based approach uses the shared file system on one side of the exchange and the LTFS on the other side of the exchange. Method 600 includes reconciling differences between the source file system and the target system so that the file can be exchanged. Method 600 may facilitate exchanging the file between the shared file system and the linear tape file system as part of operations including but not limited to, a backup operation, a de-duplication operation, a replication operation, and a disaster recovery operation.

Figure 7:
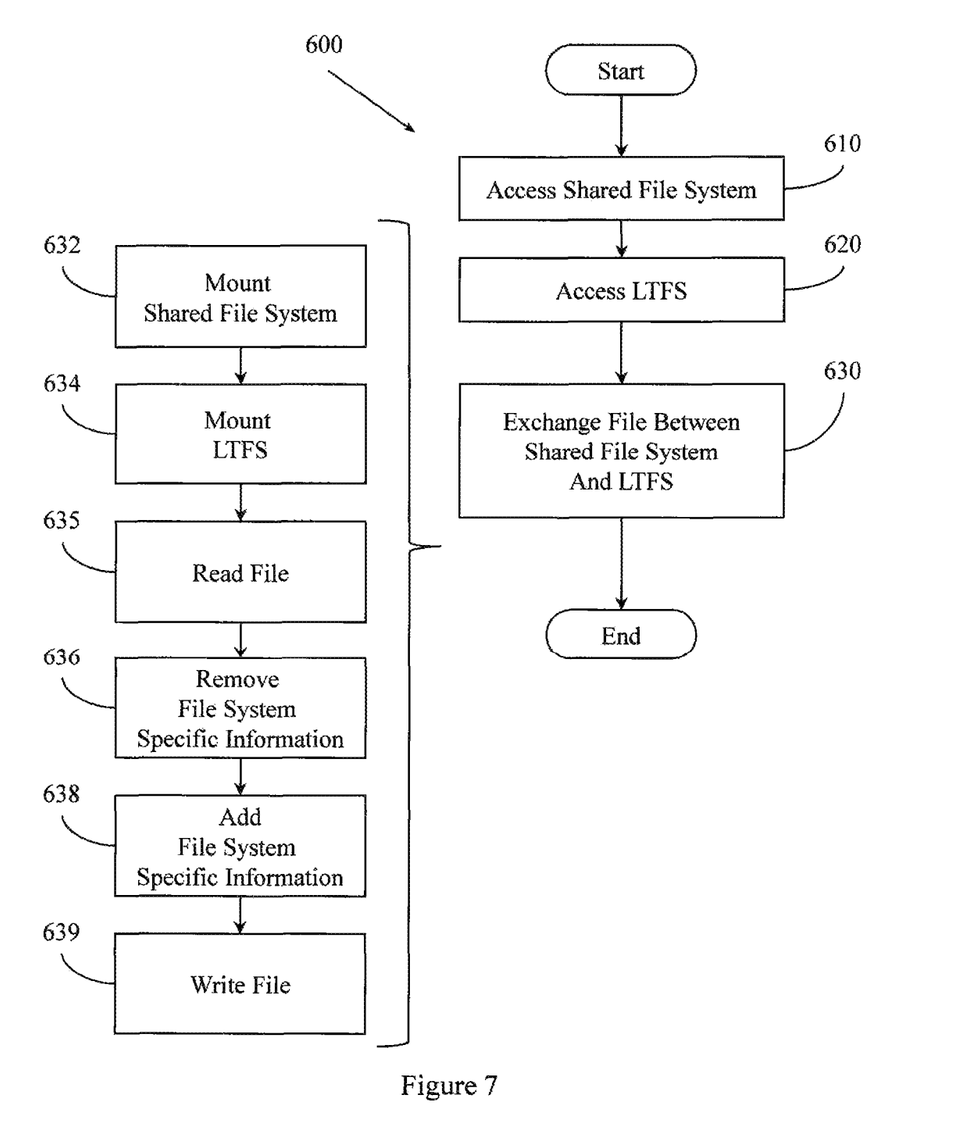
FIG. 7 illustrates a method for copying between a source file system (e.g., NFS) and a target file system (e.g., LTFS) using a file system interface.

Exchanging the file may involve reconciling differences between the two file systems. Thus, FIG. 7 illustrates additional detail for action 630 that includes reconciling the differences. In one embodiment, exchanging the file at 630 may include, at 632, mounting a shared file system volume on the NAS device and, at 634, mounting an LTFS volume on the LTO tape-based device. With the two volumes mounted on the two devices, files may now be read from or written to the volumes. The order in, which the file systems are mounted may vary.

In one example, method 600 may include, at 635, reading the file from the mounted shared file system volume on the NAS device using the shared file system. In this example, exchanging the file may include providing, at 639, the file to the LTFS volume mounted on the LTO tape-based device using the LTFS. Before the file is provided to the LTFS, method 600 may, at 636, remove file system specific information from the file and, at 638, add file system specific information to the file. Removing file system specific information may include, for example, physically removing a header, physically removing metadata, logically removing a header, logically removing metadata, setting a flag in a field, clearing a flag in a field, and other actions. Adding file system specific information may include, for example, adding a header, reconfiguring a header, setting a flag, clearing a flag, or other actions. After the removal and addition, the file may be provided to the LTFS with LTFS specific information and without shared file system specific information. The file system specific information may be stored, for example, in metadata. Therefore exchanging the file may include providing the file to the LTFS volume after adding LTFS specific metadata to the file. Providing the file may include, at 639, writing the file to the target file system on the target device.

In another example, method 600 may include, at 635, reading the file from the mounted tape file system volume on the LTO device using the LTFS. In this example, the file may be provided, at 639, to the shared file system volume after removing source file system specific metadata from the file and after adding target file system specific metadata to the file. Once again, in different embodiments, removing source file system information may include physical or logical removal. Thus, method 600 may include providing the file to the shared file system volume mounted on the NAS disk-based device using the shared file system, where the file is provided with shared file system specific information and without LTFS specific information. In this embodiment, removing file system information at 636 involves removing LTFS specific metadata from the file and adding file system information at 638 involves adding shared filed system specific metadata to the file.

While FIG. 7 illustrates various actions occurring in serial, it is to be appreciated that various actions illustrated in FIG. 7 could occur substantially in parallel. By way of illustration, a first process could mount a source file system, a second process could mount a target file system, and a third process could exchange a file between the source file system and the target system after reconciling differences between the file systems. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a non-transitory computer-readable medium may store computer executable instructions that if executed by a machine (e.g., processor) cause the machine to perform methods described herein including method 600. While executable instructions associated with the method 600 are described as being stored on a computer-readable medium, it is to be appreciated that executable instructions associated with other example methods described herein may also be stored on a computer-readable medium. For example, a non-transitory computer readable medium could store instructions that when executed by a backup server control the backup server to perform a method that includes controlling the backup target device to read a file from a network attached storage (NAS) device using a shared file system. The method may also include controlling the backup target device to remove from the file information that is specific to the NAS and the shared file system. In one embodiment, there may not be any specific information that needs to be removed and thus this action may be skipped. The method may also include controlling the backup target device to add to the file information specific to a linear tape file system (LTFS) associated with a linear tape open (LTO) tape device. Once again, in one embodiment there may not be any specific information that needs to be added and thus this action may be skipped. The method may then conclude by controlling the backup target device to write the file to the LTO tape device using the LTFS.

The following includes definitions of selected, terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", and "an example", indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and other devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 8:
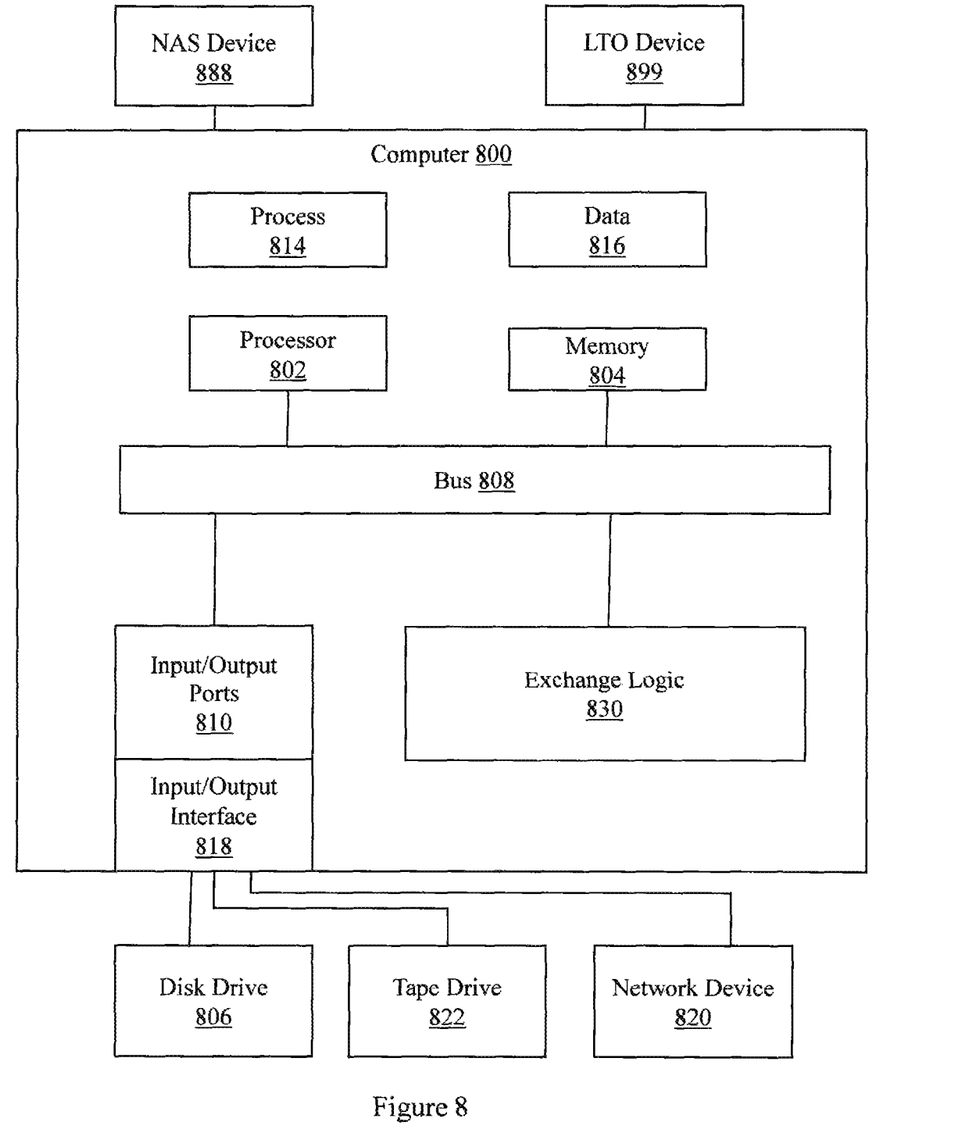
FIG. 8 illustrates a computing environment in which NFS to LTFS copying may occur.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include an exchange logic 830 configured to exchange a file between an NAS device 888 and an LTO device 899 using a file system interface between a shared file system that supports the NAS device 888 and an LTFS that supports the LTO device 899. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802. In one embodiment, the logic 830 may be distributed between two or more computing devices.

Generally describing an example configuration of the computer 800, the processor 802 may be a variety of different processors including dual microprocessor and other multiprocessor architectures. A memory 804 may include volatile memory and/or non-volatile memory. Non-volatile memory may include, for example, ROM, PROM, and other non-volatile memory. Volatile memory may include, for example, RAM, SRAM, DRAM, and other volatile memory.

A disk drive 806 or tape drive 822 may be operably connected to the computer 800 via, for example, an input/output interface (e.g., card, device) 818 and an input/output port 810. The disk 806 may be, for example, a magnetic disk drive, a solid, state disk drive, a floppy disk drive, a tape drive, a Zip drive, a flash memory card, a memory stick, and other devices. Furthermore, the disk 806 may be a CD-ROM drive, a CD-R drive, a CD-RW drive, a DVD ROM drive, a Blu-Ray drive, an HD-DVD drive, or other devices. The memory 804 may store a process 814 and/or a data 816, for example. The disk 806 and/or the memory 804 may store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be of types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and other devices. The input/output ports 810 may include, for example, serial ports, parallel ports, network ports, USB ports, and other ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers, network attached storage, (e.g., NAS device 888), and other devices. Networks with which the computer 800 may interact include, but are not limited to, a LAN, a WAN, and other networks.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent, that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan k Garner, A Dictionary of Modern Legal Usage 624 (2d. Ed. 1995).

To the extent that the phrase "one or more of, A, B, and C" is employed herein. (e.g., a data store configured to store one or more of, A, B, and C) it is intended to convey the set of possibilities A, B, C, AB, AC, BC, and/or ABC (e.g., the data store may store only A, only B, only C, A & B, A & C, B & C, and/or A & B & C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computerized method, comprising:
    accessing a shared file system on a network attached storage (NAS) disk-based device;
    accessing a tape file system on a linear tape open (LTO) tape-based device; and
    exchanging a file between the shared file system and the linear tape file system using a file system based approach throughout the exchange,
    where exchanging the file includes reading the file from a mounted shared file system volume on the NAS device using the shared file system, and providing the file to a linear tape file system (LTFS) volume on the LTO tape-based device after adding LTFS specific metadata to the file and after removing shared file system specific metadata from the file; and
    where exchanging the file includes reading the file from a mounted LTFS volume on the LTO tape-based device using the LTFS, and providing the file to the shared file system volume mounted on the NAS disk-based device after adding shared filed system specific metadata to the file and after removing LTFS specific metadata from the file.

2. The method of claim 1, the shared file system being one of, NFS (network file system), and CIFS (common internet file system).

3. The method of claim 1, the tape file system being LTFS (linear tape file system).

4. The method of claim 1, the LTO tape-based device being an LTO-5 tape-based device.

5. The method of claim 1, where exchanging the file comprises:
    mounting a shared file system volume on the NAS device, mounting an LTFS volume on the LTO tape-based device.

6. The method of claim 5, where exchanging the file comprises:
provinding the file to the LTFS volume mounted on the LTO tape-based device using the LTFS, where the file is provided with LTFS specific information and without shared file system specific information.

7. The method of claim 1, where exchanging the file comprises:
mounting a shared file system volume on the NAS device;
mounting an LTFS volume on the LTO tape-based device.

8. The method of claim 7, where exchanging the file comprises:
providing the file to the shared file system volume mounted on the NAS disk-based device using the shared file system, where the file is provided with shared file system specific information and without LTFS specific information.

9. The method of claim 1, where the shared file system is one of, a shared distributed file system, a global file system, and a storage area network (SAN) file system.

10. The method of claim 1, comprising exchanging the file between the shared the system and the linear tape file system as part of one of a backup operation, a de-duplication operation, a replication operation, and a disaster recovery operation.

11. An apparatus, comprising:
a processor;
a memory;
a set of logics that copy a file between a disk-based network attached, storage (NAS) device that supports a shared file system protocol and a linear tape open (LTO) tape device that supports a linear tape file system protocol; and
an interface that connects the processor, the memory, and the set of logics, the set of logics comprising:
a first logic that provides file input/output for the NAS device using the shared file system protocol;
a second logic that provides file input/output for the LTO tape device using the linear tape specific file system protocol; and
a protocol logic that manipulates file system specific or protocol specific metadata associated with the file being copied between the disk-based NAS device and the LTO tape device,
where the protocol logic includes reading the file from a mounted shared file system volume on the NAS device using the shared file system, and providing the file to a linear tape file system (LTFS) volume on the LTO tape-based device after adding LTFS specific metadata to the file and after removing shared file system specific metadata from the file; and
where the protocol logic includes reading the file from a mounted LTFS volume on the LTO tape-based device using the LTFS, and providing the file to the shared file system volume mounted on the NAS disk-based device after adding shared filed system specific metadata to the file and after removing LTFS specific metadata from the file.

12. The apparatus of claim 11, where the shared file system is one of, NFS (network file system), CIFS (common internet file system), a shared distributed file system, a storage area network (SAN) file system, and a global file system.

13. The apparatus of claim 11, where the linear ape specific file system protocol is the LTFS (linear tape file system).

14. The apparatus of claim 11, the apparatus being one of, a backup target device, a de-duplication server, a replication server, and a disaster recovery server.

15. A non-transitory computer-readable medium storing computer-executable instructions that when executed by a computer control the computer to perform a method, the method comprising:
controlling a backup target device to read a file from a network attached storage (NAS) device using a shared file system;
controlling the backup target device to remove from the file information specific to the NAS and the shared file system;
controlling the backup target device to add to the file information specific to a linear tape file system (LTFS) associated with a linear tape open (LTO) tape device;
controlling the backup target device to write the file to the LTO tape device using the LTFS;
controlling a backup target device to read a file from a LTO tape device using the LTFS;
controlling the backup target device to remove from the file information specific to the LTO and the LTFS;
controlling the backup target device to add to the file information specific to a shared file system associated with a NAS device; and
controlling the backup target device to write the file to the NAS device using the shared file system.

* * * * *

UNITED STATES PATENT AND TRADEMARK OFFICE
CERTIFICATE OF CORRECTION

PATENT NO. : 8,886,606 B2  
APPLICATION NO. : 13/459350  
DATED : November 11, 2014  
INVENTOR(S) : Roderick B. Wideman It is certified that error appears in the above-identified patent and that said Letters Patent is hereby corrected as shown below:

In the Specification:

In column 7, line 9, delete "in, which" and insert --in which--.

In the Claims:

In column 11, line 22, delete "shared the system" and insert --shared file system--.

In column 12, line 17, delete "ape" and insert --tape--.

Signed and Sealed this  
Twenty-fourth Day of March, 2015

Michelle K. Lee  
*Director of the United States Patent and Trademark Office*

UNITED STATES PATENT AND TRADEMARK OFFICE
CERTIFICATE OF CORRECTION

PATENT NO. : 8,886,606 B2
APPLICATION NO. : 13/459350
DATED : November 11, 2014
INVENTOR(S) : Roderick B. Wideman It is certified that error appears in the above-identified patent and that said Letters Patent is hereby corrected as shown below:

In the Specification,

In column 10, line 18, delete "Brian k Garner" and insert --Brian A. Garner--.

Signed and Sealed this
Twenty-third Day of June, 2015

Michelle K. Lee
*Director of the United States Patent and Trademark Office*